United States Patent
Crist et al.

(10) Patent No.: US 9,044,829 B2
(45) Date of Patent: Jun. 2, 2015

(54) FIBER LASER SYSTEMS FOR COLD ABLATION

(75) Inventors: Jordan Crist, Vancouver, WA (US); Jason N. Farmer, Vancouver, WA (US); Robert G. Waarts, Los Altos, CA (US)

(73) Assignee: nLight Photonics Corporation, Vancouver, WA (US)

( * ) Notice: Subject to any disclaimer, the term of this patent is extended or adjusted under 35 U.S.C. 154(b) by 730 days.

(21) Appl. No.: 12/942,888

(22) Filed: Nov. 9, 2010
(Under 37 CFR 1.47)

(65) Prior Publication Data
US 2011/0259861 A1    Oct. 27, 2011

Related U.S. Application Data

(60) Provisional application No. 61/259,513, filed on Nov. 9, 2009.

(51) Int. Cl.
| B23K 26/00 | (2014.01) |
| B23K 26/36 | (2014.01) |
| B23K 26/06 | (2014.01) |
| B23K 26/40 | (2014.01) |

(52) U.S. Cl.
CPC .............. B23K 26/36 (2013.01); B23K 26/0635 (2013.01); B23K 26/4075 (2013.01); *B23K 2201/40* (2013.01)

(58) Field of Classification Search
CPC ............... B23K 26/0635; B23K 26/36; B23K 26/4075; B23K 2201/40
USPC ............. 219/121.61, 121.67, 121.68, 121.69, 219/121.72; 438/22, 463
See application file for complete search history.

(56) References Cited

U.S. PATENT DOCUMENTS

| 2002/0100749 A1* | 8/2002 | Swenson et al. ......... 219/121.69 |
| 2005/0272175 A1* | 12/2005 | Meier et al. ..................... 438/22 |
| 2005/0274702 A1* | 12/2005 | Deshi ....................... 219/121.72 |
| 2006/0088984 A1* | 4/2006 | Li et al. .......................... 438/463 |
| 2007/0144216 A1 | 6/2007 | Janka et al. |
| 2007/0272668 A1* | 11/2007 | Albelo et al. ............ 219/121.72 |
| 2008/0130102 A1* | 6/2008 | Murison et al. ............ 359/341.3 |
| 2010/0177794 A1* | 7/2010 | Peng et al. ..................... 372/25 |

FOREIGN PATENT DOCUMENTS

GB          2459669 A    * 11/2009    ............. H01L 21/78

OTHER PUBLICATIONS

Luther-Davies et al., "Picosecond high-repetition-rate pulsed laser ablation of dielectrics: the effect of energy accumulation between pulses", Optical Engineering, 44(5):051102-1-051102-8 (May 2005).

(Continued)

*Primary Examiner* — Thien S Tran
(74) *Attorney, Agent, or Firm* — Klarquist Sparkman, LLP (57) ABSTRACT

Scribing operations with reduced substrate heating can be provided by applying multiple optical pulses to a substrate within a time interval that is less than a material recombination time. Typically a series of pulses of durations of 5-200 ps with pulse energies of less than about 0.002 mJ can be applied at rates of about 1 MHz to about 30 MHz. Beam area and beam scanning are configured to provide substantial overlap so that material can be removed by cold ablation.

17 Claims, 5 Drawing Sheets

(56) References Cited

OTHER PUBLICATIONS

T. Apostolova, "Theoretical Study of Sub-to-Picosecond Laser Pulse Interaction with Dielectrics, Semiconductors and Semiconductor Heterostructures," Fifteenth International Summer School on Vacuum, Electron and Ion Technologies, *Journal of Physics: Conference Series,* (2008), vol. 113, 1-11.

Exharos et al., eds., "Laser-Induced Damage in Optical Materials: 2001," Proc. SPIE, 33$^{rd}$ Annual Boulder Damage Symposium, Boulder, Colorado, Oct. 1-2, 2001, vol. 4679, pp. 124, 126 and 130-132.
Johannes Giesecke, "Quantitative Recombination and Transport Properties in Silicon from Dynamic Luminescence," Switzerland, Springer International Publishing, (2014), pp. 29 and 30.
Mohammad Ziaur Rahman, "Modeling Minority Carrier's Recombination Lifetime of p-Si Solar Cell," *International Journal of Renewable Energy Research,* (2012), vol. 2, 117-122.

* cited by examiner

FIBER LASER SYSTEMS FOR COLD ABLATION

CROSS REFERENCE TO RELATED APPLICATION

This application claims the benefit of U.S. Provisional Application 61/259,513, filed Nov. 9, 2009, which is incorporated herein by reference.

FIELD

The disclosure pertains to systems and methods for materials processing using pulsed lasers.

BACKGROUND

Material processing such as cutting or scribing with optical beams (typically laser pulses) has been used in a variety of applications. Because laser pulse processing offers some process simplifications, users are typically satisfied with their results, and are unaware that unexpectedly superior results can be achieved by appropriate selection of process parameters. Moreover, many conventional laser-based processing systems use bulky, complex, and difficult to maintain laser systems. Improved systems and methods that can provide superior processing and the associated processed materials are described herein.

SUMMARY

Methods of removing a material from a substrate include selecting an exposure wavelength associated with absorption in the material and at least one pulse interval between optical pulses that is less than a material recombination time. At least two optical pulses are applied at the selected exposure wavelength and at the selected pulse interval at a pulse energy sufficient to remove at least a portion of the material. In some examples, applying at least two optical pulses includes periodically applying optical pulses at a repetition rate having a period that is less that the selected pulse interval. In further examples, the optical pulses have pulse durations less than the material recombination time. In some embodiments, optical pulse durations are less than about 1 ns, 100 ps, 20 ps, or 10 ps. In some representative examples, the material is a transmissive oxide, and the selected wavelength is about 355 nm. In additional examples, the optical pulses are applied in an optical beam having a beam cross-sectional area at the material to be removed, and the optical beam and the material are scanned with respect to each other at a scanning speed such that a product of the scanning speed and the pulse interval is less than about 1/10, 1/100, or 1/1000 of a dimension associated with beam cross-sectional area. Typically, the dimension is a beam width in a scan direction.

Additional methods comprise selecting a material to be ablated, and applying a series of optical pulses to the material at pulse energies sufficient to ablate the material and at pulse periods and pulse durations so as to ablate the material without substantially heating a substrate on which the material is situated. In some examples, the series of optical pulses is applied by scanning the material with respect to an optical beam and the scanning is configured to produce a scribed line in the material.

Laser scribing apparatus include a laser system configured to provide optical pulses at rate of between about 1 MHz and 100 MHz, pulse durations of less than about 1 ns, and pulse energies of at least about 100 nJ. A modulator is configured to receive the optical pulses and produce an output pulse train at a rate of between about 1 MHz and 30 MHz. An optical system is configured to direct the optical pulses to a substrate so as to scribe a material on the substrate without producing a heat affected zone. In some examples, the laser system is a diode-pumped, mode-locked fiber laser. In some examples, the pulse duration is less than about 100 ps, 10 ps, or 1 ps. In some embodiments, the laser system includes a harmonic generator configured to produce radiation at a wavelength that is a harmonic of a laser fundamental wavelength, and a wavelength associated with the optical pulses delivered to the substrate is a harmonic wavelength. In further representative examples, the optical pulses are applied to the substrate in an optical beam having a beam cross-sectional area at the substrate, and a scanner is configured to scan the optical beam and the substrate with respect to each other at a scanning speed such that a product of the scanning speed and a pulse interval is less than about 1/2, 1/5, 1/10, 1/100, or 1/1000 of a dimension associated with beam cross-sectional area. In additional embodiments, a pulse interval is less than a recombination time in the scribed material. In other examples, an optical pulse duration is less than a recombination time in the scribed material. In still further examples, pulse wavelength, pulse duration, pulse interval, and pulse energy produced by the laser system are adapted for processing of at least one of a metal, a transparent oxide, alpha silicon, or a copper indium gallium diselenide layer so as to avoid formation of a heat affected zone.

These and other features and aspects of the disclosed technology are set for the below with reference to the accompanying drawings.

DETAILED DESCRIPTION

As used in this application, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

Some aspects of laser materials processing are described in Herman et al., U.S. Pat. No. 6,552,301 which is incorporated herein by reference.

For convenience in the following description, optical radiation refers to electromagnetic radiation in a wavelength range from about 200 nm and 1600 nm. An optical pulse duration is generally a time interval during which an optical pulse has an power of greater than one half of peak pulse power (i.e., full width at one half maximum) or a power greater than 1/e of peak pulse power. An optical pulse interval is a time period between temporally adjacent optical pulses, and can be measured from pulse peak intensities, pulse leading or trailing edges, or pulse centers. In some convenient examples, optical pulses are provided at a fixed repetition rate (and thus a fixed pulse interval) such as is typical of mode locked lasers, but variable pulse intervals can be used as well. For periodic pulses, a pulse interval corresponds to a period. In some examples, a material to be processed and an optical beam are translated with respect to each other so as to remove material to form lines or other features. Such translation is referred to herein as scanning, and either a substrate or a beam or both can be moved to accomplish such scanning. Typically scanning speeds are sufficiently slow so that multiple optical pulses substantially overlap on a material being processed. Typically a product of scanning speed and an interval between pulses is substantially less than a cross-sectional dimension of the optical beam at the material processed. In some examples, suitable fiber laser systems are described as such systems can provide suitable optical pulse arrangements and are especially practical, but other laser systems can be used.

Figure 1:
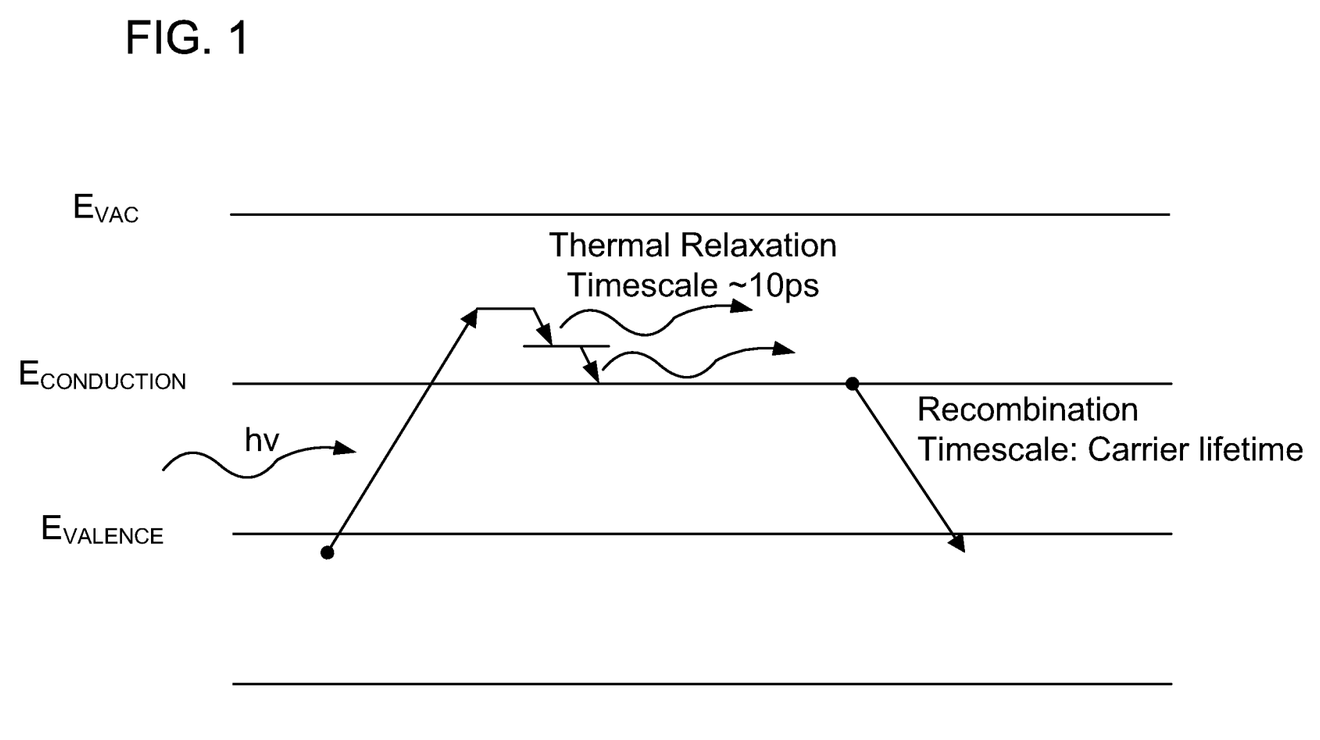
FIG. 1 is a representative band diagram of a semiconductor material.

With reference to FIG. 1, a representative energy band diagram for material to be laser processed is illustrated. The band diagram includes a valence band with a valence band energy $E_V$ at a top of the valence band, a conduction band with a conduction band energy $E_C$ at a bottom of the conduction band. A so-called vacuum energy $E_{VAC}$ is associated with energy needed to ionize the material by freeing a bound electron.

Laser processing of a material associated with such a band diagram can be described as follows. An incident laser beam of photons of photon energy greater that a difference $E_C$-$E_V$ excites an electron from the valence band into the conduction band. The conduction band electron then thermally relaxes to the bottom of the conduction band with a time constant that is typically between about 1 ps and 10 ps. Any excess energy lost by the electron is associated with heating the material. After thermal relaxation, the electron returns to the valence band via recombination at a rate associated with carrier lifetime that is typically much longer than the thermal relaxation rate. By providing laser pulses of pulse duration less than or about the same as the thermal relaxation time, material heating can be reduced.

Figure 2:
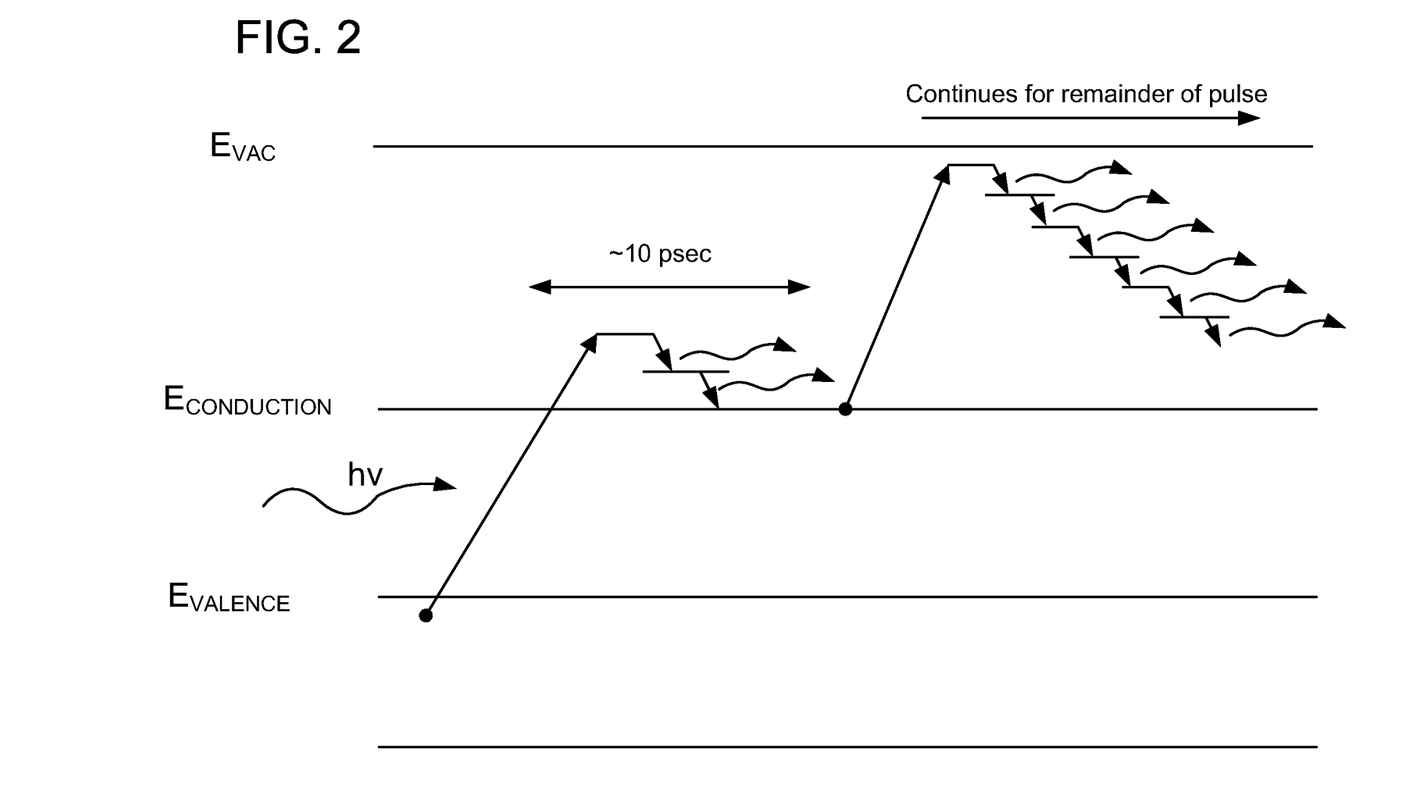
FIG. 2 illustrates the effects of applying optical pulses that have pulse durations longer than a thermal relaxation time and shorter than a recombination time.

With reference to FIG. 2, the band diagram of FIG. 1 is used to illustrate the effects of laser pulses of durations longer than the thermal relation time. After excitation of the electron into the conduction band, the laser pulse continues to excite the conduction band electron which then thermally relaxes toward the bottom of the conduction band. This process repeats during the laser excitation, heating the material being processed.

After a laser pulse ends, conduction band electrons thermally relax and then decay to the valence band by recombination. The recombination time is associated with minority carrier lifetime. For some classes of materials such as photovoltaic materials, longer minority carrier lifetimes are preferred. Thus, laser processing of such materials can be improved by providing a subsequent laser pulse within one carrier lifetime. For many semiconductor materials, carrier lifetimes are between about 30 ns and about 500 ns, but can be as large as tens of µs in silicon. Thus, an initial laser pulse can be used to excite an electron into the conduction band with subsequent thermal relaxation, permitting heat produced by thermal relaxation to dissipate.

While material can be removed by heating, in some applications heating should be avoided. If ns scale laser pulses are used for processing, the repeated excitation and thermal relaxation of conduction band electrons tends to heat the material undergoing processing. The process for material removal with long pulses is based mostly on local heating of the material and evaporation and or melting. The pulse length is chosen to be typically shorter than the time for thermal diffusion which typically is microseconds but can vary widely depending on material. This process typically creates a heat affected zone (HAZ). Thus, nanosecond scale pulses are typically not appropriate for applications in which heating is to be reduced or avoided. For ablation without such thermal effects (so-called "cold ablation") laser pulses are preferably selected to produce ionization but with reduced material heating. Due to the relatively large ionization energies of most materials with respect to photon energy at typical laser wavelengths, multi-photon ionization is needed. By optically exciting electrons to the conduction band with a first laser pulse, then applying subsequent laser pulses (within a time shorter than the recombination time), ionization efficiency can be increased. Subsequent pulses can be applied at time intervals such that thermal effects are reduced, but without carrier recombination.

To summarize, laser pulse length, energy and repetition rate play a substantial role in the ablation process. Long pulses (>1 ns) typically heat the material locally provided there is sufficient absorption at the laser wavelength and the thermal time constant of the material is long with respect to the pulse length such that the heat does not substantially diffuse. Material removal using this process results in high temperatures and evaporation of the material. The evaporation pressure also pushes the molten material underneath away. The overall process results in material removal with a heat affected zone (HAZ). For shorter pulses (typically <1 ns) ablation or cold ablation is possible. In this process the electric field strength is sufficient to remove electrons and create a plasma without a HAZ. Cold ablation may be based on single pulses but more conveniently in many semiconductor and other materials may be based on a high repetition rate pulse train of much lower energy pulses. The latter approach results in more precise ablation. In addition the smaller pulse energies are more easily attainable from compact and efficient laser sources. High energy and low repetition rate pulsed laser sources typically require complex and large stretching and compression of the pulses for amplification of the pulsed light in the amplifiers without damage in the amplifiers. High repetition rate and low energy pulses may more easily be obtained from lasers without such complexity. This is true in particular for lasers based on compact and efficient fiber lasers.

Representative Laser Systems

Optical pulses that are suitable for cold ablation typically have pulse durations of about 1 psec or less to 10 ps to 1 ns at repetition rates of between sub kHz and 30 MHz. It will be appreciated that pulse durations, repetition rates, and other optical pulse parameters can be configured for a particular material based on thermal relaxation, recombination times, or other material characteristics. High power sub nsec pulse sources are typically based on diode pumped solid state lasers with output wavelengths of about 1 µm. Within the class of diode pumped solid state lasers, double clad fiber lasers are of particular interest in commercial applications as they are robust and efficient and can provide high average power with good beam quality. For convenient fiber laser systems based on Yb doping, pulses can be at a fundamental wavelength (about 1064 nm) and at one or more optical harmonics (532 nm, 355 nm, 266 nm). Typical pulse energies are in a range of about 0.1 µJ to about 20 µJ or higher. For convenient harmonic generation, fundamental pulses that are polarized have a spectral bandwidth of less than about 1-2 nm. As noted above, such systems are useful in cold ablation as pulses are short enough to provide efficient excitation into the conduction band while reducing heat generation and allowing thermal dissipation.

Figure 3:
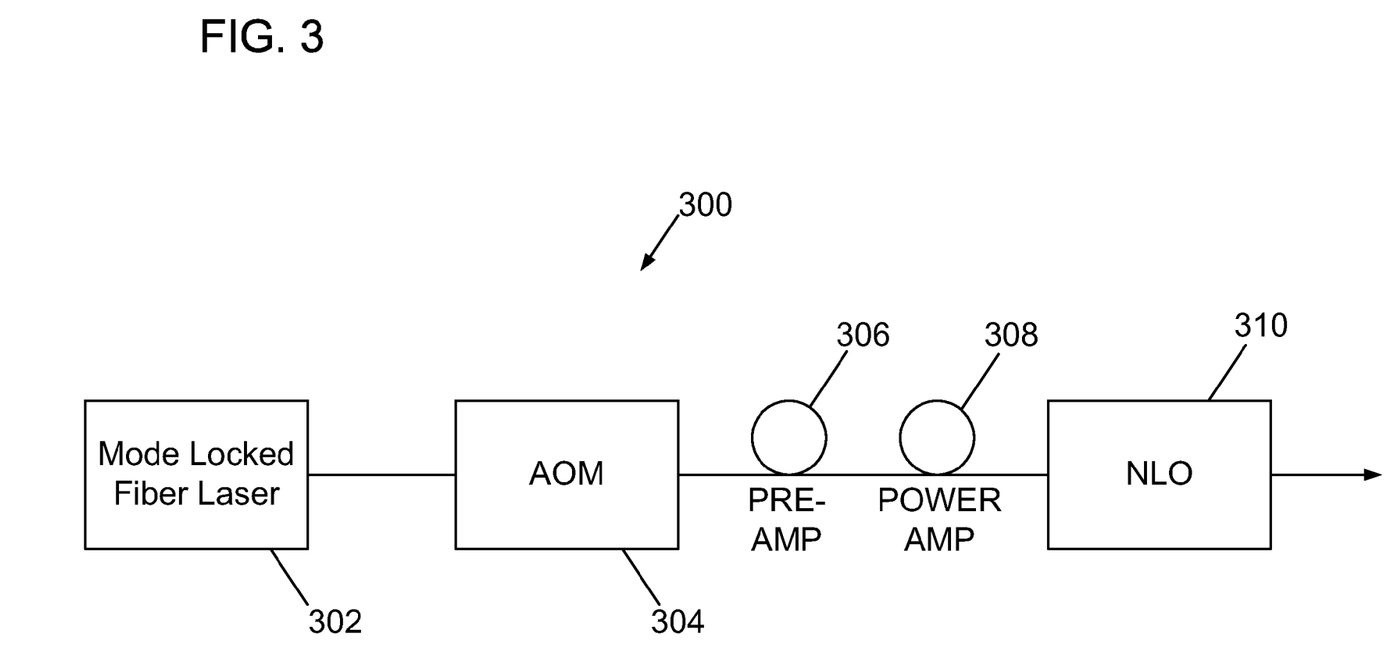
FIG. 3 illustrates a representative fiber laser system configured for cold ablation.

FIG. 3 illustrates a representative laser system 300 configured for cold ablation. For simple illustration, some optical elements such as beam shaping and focusing elements are not shown. The laser system 300 includes a diode pumped, mode-locked fiber laser 302 that typically provides mode-locked optical pulses at a repetition rate of between about 1 MHz and 100 MHz. These pulses are coupled to an optical modulator (typically an acousto-optic modulator (AOM)) 304 that modulates the input pulse train so to produce an output pulse train with a pulse rate of between about 1 MHz and 30 MHz. Other types of optical modulators can be used if more convenient. The AOM output pulse train is then delivered to a fiber pre-amplifier 306 and a fiber power amplifier 308. Additional amplifiers may be used if needed for additional optical gain for the pulses. The amplified pulses are then coupled to one or more non-linear optics (NLO) to produce $2^{nd}$, $3^{rd}$, or other optical harmonics. Other wavelengths may also be generated by frequency mixing of the harmonics and the fundamental beam. For harmonic generation of pulse wavelengths about 1064 nm, one or more non-linear materials such as lithium triborate ($LiB_3O_5$) or other materials can be used in which phase matching can be achieved for efficient non-linear conversion. Typical output pulses at a fundamental wavelength have pulse durations of about 10 ps full width at half maximum (FWHM) with total pulse energies of about 2 µJ.

The fiber pre-amplifier 306 and the fiber power amplifier 308 are generally selected to provide suitable total optical gain without introducing non-linearities that reduce the applicability of the output pulses. For example, because optical pulse powers in the pre-amplifier 306 are less than optical powers in the power amplifier 308, the fiber for the pre-amplifier has fewer constraints on its selection. Fiber nonlinearities in a gain fiber and associated with the Brillouin effect, the Raman effect, and the Kerr effect generally produce effects on laser pulses that are related to a product of pulse intensity and fiber length, wherein pulse intensity is pulse power divided by beam area in the fiber. In some cases, fiber length corresponds to pulse extent in the fiber. Thus, to reduce the effects of non-linearities in the fiber pre-amplifier 306 and the fiber power amplifier 308 (and particularly in the power amplifier 308), high dopings are preferred so that a large gain/length can be achieved. High dopings can be conveniently provided with fibers fabricated using so-called Direct Nanoparticle Deposition as described in Janka et al., United States Patent Application Publication 20070144216, which is incorporated herein by reference. Representative fibers are double clad polarization maintaining Yb doped fibers such as a 25 µm core/250 µm cladding diameter fiber with a peak pump absorption of about 11 dB/m at 976 nm and a 10 µm core/125 µm cladding diameter fiber with a peak pump absorption at 976 nm of about 6.5 dB/m available. Such fibers are available from nLight Corporation, Vancouver, Wash.

Pump sources for the fiber pre-amplifier 306 and the fiber power amplifier 308 are not shown in FIG. 3, and are generally selected to provide pump radiation at a suitable wavelength or in a suitable wavelength range for pumping the fiber dopant. For pumping rare earth dopants, wavelengths in range of between about 800 nm and 1500 nm are used. For neodymium doping, pump wavelengths are typically around 808 nm. Pump radiation is generally coupled into the amplifier fibers using fiber couplers, also not shown in FIG. 3. Pump radiation can be arranged to be co-propagating or counter-propagating with the mode locked pulses.

Representative Application

Figure 4:
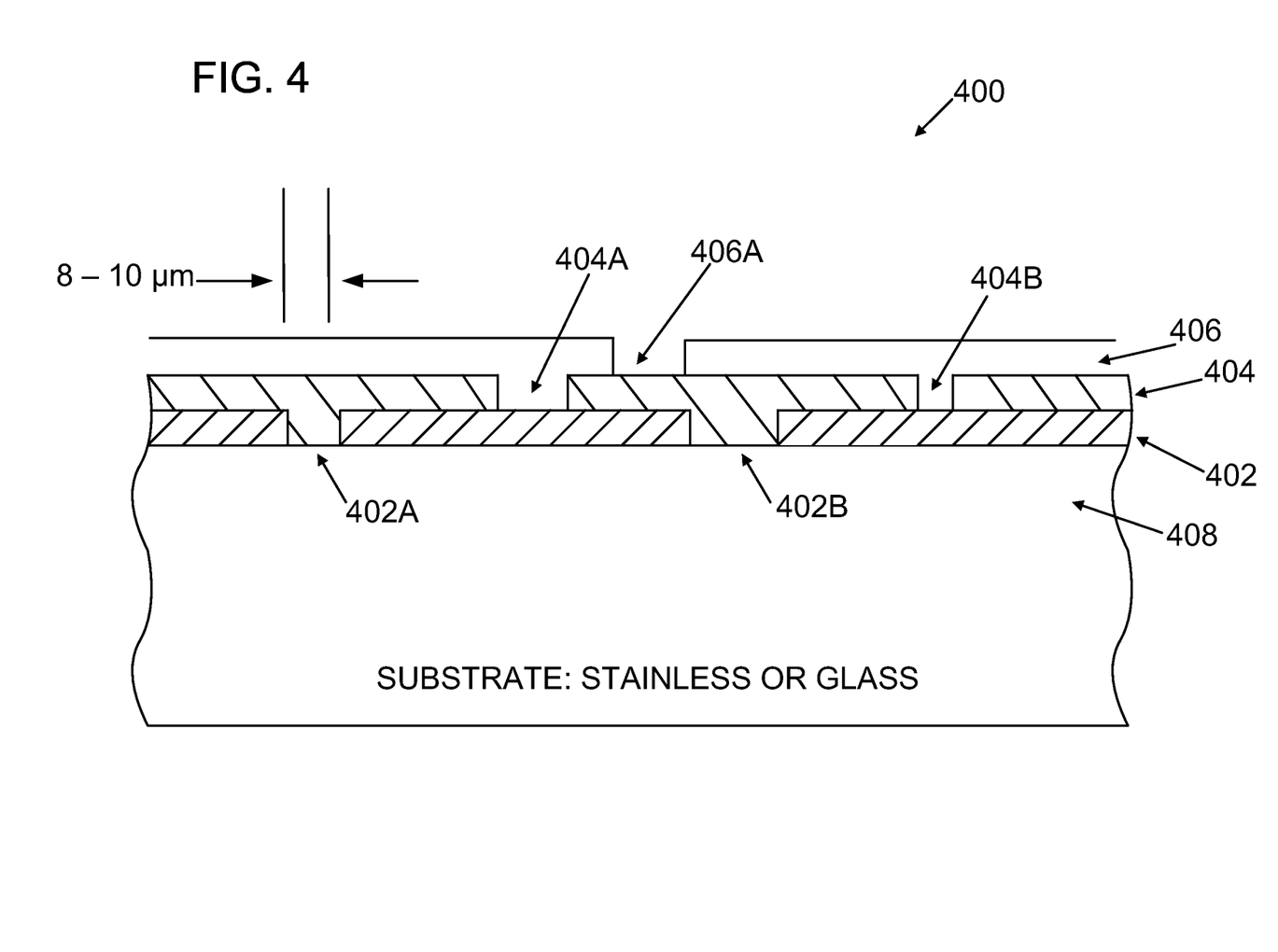
FIG. 4 is a sectional view of a representative photovoltaic device.

FIG. 4 is a cross-sectional diagram illustrating a portion of a representative photovoltaic cell 400. As shown in FIG. 4, a bottom contact layer 402 is situated on a substrate 408 such as glass, fused silica, stainless steel, or other rigid or flexible substrate. An absorber layer 404 is situated on the bottom contact layer 402, and a top contact layer 406 is situated on the absorber layer 404. The substrate layer can be optically transparent, reflective, or absorptive. The bottom contact layer can be a metallic layer or a transparent conductive oxide layer formed of indium tin oxide, tin oxide, or other transparent conductive oxide. Some devices are provided with transparent substrate layers and transparent bottom contact layers to receive illumination through the substrate layer.

The absorber layer 404 is generally α:Si or copper indium gallium diselenide (CIGS), and the top conductor layer 406 can be a metallic layer or a transparent oxide layer depending on, for example, whether front side or back side illumination is intended. For devices that include CIGS, additional buffer layers of aluminum doped zinc oxide and CdSe are provided, but are not shown in FIG. 4. For convenience typical layer thicknesses and compositions are listed in Table 1 below.

Representative Layers

| Layer | Material | Thickness |
|---|---|---|
| Bottom contact layer (402) | transparent oxide, metal | 0.1 to 1.0 µm |
| Absorber layer (404) | α-silicon, CIGS | 1-3 µm |
| Top contact layer (406 | transparent oxide, metal | 0.1 to 0.5 µm |

Other layers can also be included such as reflective layers situated to direct light flux transmitted by an optically absorptive layer back to the absorptive layer to increase efficiency. These and other materials are listed in attached Tables 2-4 that also list preferred laser wavelengths for processing, and possible and preferred pulse durations for processing.

Referring further to FIG. 4, a simplified manufacturing process can be described as follows. The bottom contact layer 402 is formed and then scribed regions 402A, 402B are provided in the bottom contact layer 402. The absorber layer 404 is then formed, and scribed regions 404A, 404B are formed in the absorber layer 404. Finally, the top contact layer 406 is formed and a scribed region 406A is formed. Scribed regions arranged as shown permit photovoltaic portions to be interconnected in series without external connections. In addition, as shown in FIG. 4, typical scribe region widths produced with the laser apparatus described above are between about 8-50 µm, and have substantially straight side walls. Scribed portions of the photovoltaic cell 400 generally do not contribute to photovoltaic conversion, and narrow scribe widths are desirable.

Figure 5A:
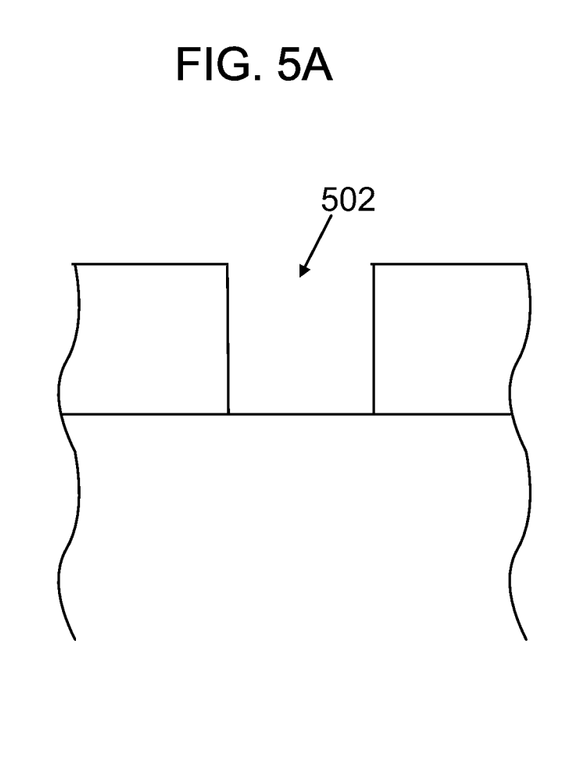
FIGS. 5A-5B illustrate scribe profiles produced by cold ablation and conventional methods, respectively.
Figure 5B:
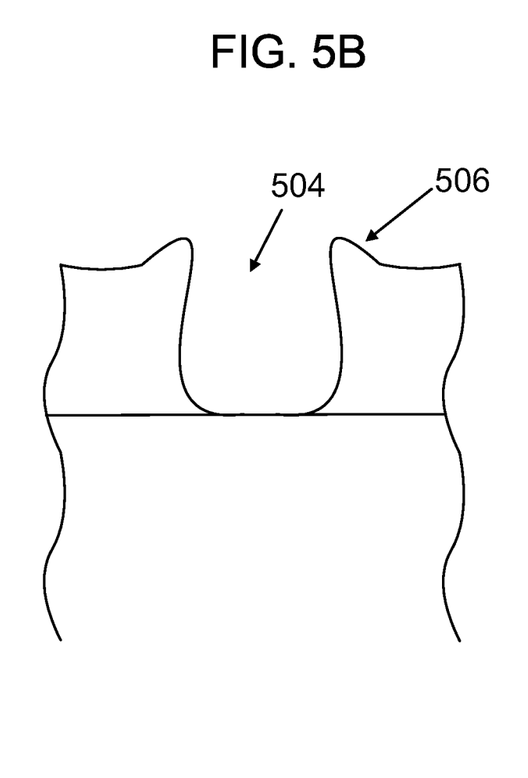

Scribed portions of the photovoltaic cell can be formed with an apparatus such as illustrated in FIG. 3. Laser pulses at a selected wavelength or a combination thereof can be applied to produce the scribed regions while the beam and the substrate are scanned with respect to each other. A suitable wavelength can be selected based on properties of the material to be scribed (i.e., removed by cold ablation). For example, layers that absorb visible radiation can be exposed to Yb second harmonic pulses having a wavelength of about 532 nm. Visibly transparent layers such as transmissive oxides can be scribed with Yb third harmonic pulses having a wavelength of about 355 nm. The laser system of FIG. 3 can be configured to provide pulse energies at wavelengths, pulse durations, pulse repetition rates for satisfactory scribing with a laser beam focused to a specified beam diameter. Typically, narrow scribe lines are preferred, but in some cases, the scribe lines can be relatively deep in comparison with layer thickness, and wider scribed lines can be provided to assure that scribed areas are filled when subsequent layers are deposited. In contrast to conventional scribe lines produced with nanosecond pulses, the scribe lines produced with the apparatus of FIG. 3 can have substantially vertical side walls, have substantially no surrounding heat damaged or recrystallized region, and appear in plain view as straight lines with little or no evidence of the application of repetitive pulses for scribing. Typically, a scan rate is selected so that multiple pulses ablate material continuously during scanning. A sectional view of a representative cold ablated scribed line 502 is shown in FIG. 5A. Conventional scribing produces thermal damage, recrystallization, and lines formed as a series of connected spots associated with exposure to laser pulses. FIG. 5B illustrates such a scribed line 504 with associated thermally melted and/or recrystallized region 506. Of course, the FIG. 5B result can be obtained with less than optimum focusing or other detuning of a pulsed laser system that can produce cold ablation.

| Thin Film P1 Materials | | | | |
|---|---|---|---|---|
| Material | Typical Thickness (µm) | Optimal Wavelengths | Possible Pulse Lengths | Optimal Pulse Length |
| Molybdenum | 0.1-0.5 | 532 nm | ≤100 ns | ≤1 ns |
| ITO | 0.5-1 | ≤532 nm | ≤10 ns | ≤20 ps |
| $SnO_2$:F | 0.5-1.2 | ≤532 nm | ≤10 ns | ≤20 ps |
| ZnO | 0.3-1 | ≤532 nm | ≤10 ns | ≤20 ps |

| Thin Film P2 Materials | | | | |
|---|---|---|---|---|
| Material | Typical Thickness (µm) | Optimal Wavelengths | Possible Pulse Lengths | Optimal Pulse Length |
| CIGS | 1-3 | Visible 532 nm | ≤10 ns | ≤20 ps |
| CIS | 1-3 | Visible 532 nm | ≤10 ns | ≤20 ps |
| Tandem Cell a:Si & c:Si | 1.2-3 | Visible 532 nm | ≤10 ns | ≤20 ps |
| a:Si | 0.3-0.8 | Visible 532 nm | ≤10 ns | ≤20 ps |
| mc:Si | 0.8-2 | Visible 532 nm | ≤10 ns | ≤20 ps |
| CdTe | 2-8 | Visible 532 nm | ≤10 ns | ≤20 ps |

| Thin Film P3 Materials | | | | |
|---|---|---|---|---|
| Material | Typical Thickness (µm) | Optimal Wavelengths | Possible Pulse Lengths | Optimal Pulse Length |
| ZnO | 0.15-0.7 | ≤532 nm | ≤10 ns | ≤20 ps |
| AlZnO | 0.15-0.7 | ≤532 nm | ≤10 ns | ≤20 ps |
| Al | 0.15-0.5 | ≤1064 nm | ≤100 ns | ≤10 ns |
| Ag | 0.1-0.5 | ≤1064 nm | ≤100 ns | ≤10 ns |
| Au | 0.1-0.5 | ≤1064 nm | ≤100 ns | ≤10 ns |

The above example is representative and other combinations can be used. For example, laser pulse repetition rate and pulse energy can be varied, and beam scan speed on a material being processed can be constant or variable. Pulse bursts or pulse "packages" of duration of about 1-10 ns can be used, that contain a few or many ps pulses. Beam spot size can be varied and beams from multiple laser sources at one or more wavelengths can be applied sequentially, alternately, or simultaneously. The laser beam (or the packaged pulses) can be delivered using an optical fiber or other waveguide, and laser parameters can be adjusted during ablation for each or all layers to be processed.

The laser can include a pulse compressor and stretcher at large pulse energies that are not provided at lower pulse energies. A variety of seed sources can be used such as mode locked lasers such as fiber lasers or semi-conductor lasers or externally modulated laser such as semiconductor lasers. One or more fiber amplifiers can be used, and Yb, Nd, E, Ho, and/or Tm doped fibers for used can be used to produce laser pulses at other wavelengths such as 1.55 µm or 2 µm, Polarization maintaining fiber can also be used. Double clad fiber pumped at 976 nm can be used for short interaction lengths, and end pumping can be used for short interaction lengths. In some examples, bulk glass, crystal or ceramic amplifiers can be used.

Cold ablation typically produces straight walls which may create shadow effects in subsequent deposition steps. Different shaped side walls can be created by illumination at an angle with one or more beams or dithering of a single beam. Illumination angles can be varied by adjusting either the beam delivery or the substrate being processed.

APPENDIX

The removal process with high repetition rate, short pulsed lasers may depend highly on the material. Luther-Davies at el., describes ablation in an arsenic trisulphide glass. In this paper it is demonstrated that ablation pulse energies for a high repetition rate laser source are substantially below the ablation pulse energies required for a single pulse. In this material it is argued that the process is based on initial evaporation of the material followed by the creation of a plasma by subsequent pulses. See Barry Luther-Davies et al., "Picosecond high-repetition-rate pulsed laser ablation of dielectrics: the effect of energy accumulation between pulses," Optical Engineering 44(5), 051102 (May 2005) pp 051102-1 to 051102-8, which is incorporated herein by reference.

We claim:

1. A method of removing a material from a substrate, comprising:
   selecting an exposure wavelength associated with absorption in the material;
   selecting at least one pulse interval between optical pulses that is less than a material recombination time and greater than a thermal relaxation time associated with the material and the substrate;
   providing optical pulses at a rate of between about 1 MHz and 100 MHz;
   modulating the optical pulses to produce an output pulse train at a rate of between about 1 MHz and 30 MHz, such that a pulse interval associated with the output pulse train is the selected pulse interval;
   delivering the output pulse train to a fiber pre-amplifier and a fiber power amplifier selected to provide total optical gain; and
   applying at least two optical pulses at the selected exposure wavelength and at the selected pulse interval at a pulse energy sufficient to remove at least a portion of the material.

2. The method of claim 1, wherein the applying at least two optical pulses includes periodically applying optical pulses at a repetition rate having a period that is less than the selected pulse interval.

3. The method of claim 2, wherein the optical pulses have pulse durations less than the material recombination time.

4. The method of claim 1, wherein the optical pulses have pulse durations less than the material recombination time.

5. The method of claim 4, wherein the pulse duration is less than about 1 ns.

6. The method of claim 5, wherein the pulse duration is less than about 100 ps.

7. The method of claim 6, wherein the material is a transmissive oxide, and the selected wavelength is about 355 nm.

8. The method of claim 6, wherein the optical pulses are applied in an optical beam having a beam cross-sectional area at the material to be removed, and the optical beam and the material are scanned with respect to each other at a scanning speed such that a product of the scanning speed and the pulse interval is less than about $1/100$ of a dimension associated with beam cross-sectional area.

9. A method, comprising:
   selecting a material to be ablated;
   generating a first series of optical pulses at a first wavelength and a first repetition rate;
   applying a modulation to the first series of optical pulses to produce a second series of optical pulses at the first wavelength and at a second repetition rate, wherein the second repetition rate is less than the first repetition rate;
   converting the second series of optical pulses from the first wavelength to a second wavelength that is a harmonic of the first wavelength; and
   applying the second series of optical pulses at the second wavelength to the material at pulse energies sufficient to ablate the material and at pulse periods and pulse durations so as to ablate the material without substantially heating a substrate on which the material is situated, wherein the pulse period is less than a material recombination time and greater than a thermal relaxation time associated with the material and the substrate.

10. The method of claim 9, wherein the second series of optical pulses is applied by scanning the material with respect to an optical beam.

11. The method of claim 10, wherein the scanning is configured to produce a scribed line in the material.

12. The method of claim 9, wherein the second series of optical pulses is applied so that adjacent pulses are applied within a time less than a recombination time in the material to be ablated.

13. The method of claim 9, wherein the pulse wavelength, pulse duration, pulse interval, and pulse energy of the optical pulses are suited for processing of at least one of a metal, a transparent oxide, alpha silicon, or a copper indium gallium diselenide layer.

14. The method of claim 9, further comprising producing the optical pulses as optical harmonics of a laser fundamental wavelength.

15. The method of claim 9, further comprising applying the optical pulses to the material in an optical beam having a beam cross-sectional area at the material, and scanning the optical beam and the material with respect to each other at a scanning speed such that a product of the scanning speed and the pulse interval is less than about $1/100$ of a dimension associated with beam cross-sectional area.

16. The method of claim 9, further comprising amplifying in a fiber the second series of optical pulses, prior to converting from the first wavelength to the second wavelength, to increase optical gain.

17. The method of claim 16, wherein the fiber is a double clad polarization maintaining Yb doped fiber selected from a 25 µm core/250 µm cladding diameter fiber with a peak pump absorption of about 11 dB/m at a pump wavelength of 976 nm, or a 10 µm core/125 µm cladding diameter fiber with a peak pump absorption of about 6.5 dB/m at a pump wavelength of 976 nm.

* * * * *